United States Patent

Conner

[15] 3,642,324

[45] Feb. 15, 1972

[54] LOAD-SUPPORTING BED UNIT FOR A TRUCK

[72] Inventor: Tom E. Conner, Elk Grove, Calif.

[73] Assignee: Tom's Hydraulic Supply, Elk Grove, Calif.

[22] Filed: Apr. 27, 1970

[21] Appl. No.: 32,085

[52] U.S. Cl. .................................................. 298/11
[51] Int. Cl. ................................................... B60p 1/34
[58] Field of Search .............. 298/11, 22 R, 23 MD, 23 M

[56] References Cited

UNITED STATES PATENTS

| 2,072,998 | 3/1937 | Allin | 298/23 MD |
| 2,527,369 | 10/1950 | Meyer | 298/11 |
| 2,899,172 | 8/1959 | Cresci | 298/11 UX |
| 3,036,865 | 5/1962 | Stone | 298/11 |

FOREIGN PATENTS OR APPLICATIONS 152,316  11/1955  Sweden............................... 298/11

Primary Examiner—Richard J. Johnson
Attorney—Webster and Webster

[57] ABSTRACT

A load-supporting bed unit, for a truck, comprised of a normally lowered but upwardly movable frame connected between a fixed structure on the truck and a load-supporting bed thereabove, and a power device adapted to move the frame upwardly; the frame and associated mechanism being arranged so that the bed, when moved upwardly by the power device, normally remains in its horizontal position, or—upon nonmanual quick repositioning of certain novel means—is caused to tilt rearwardly to a back-dumping position, selectively.

3 Claims, 6 Drawing Figures

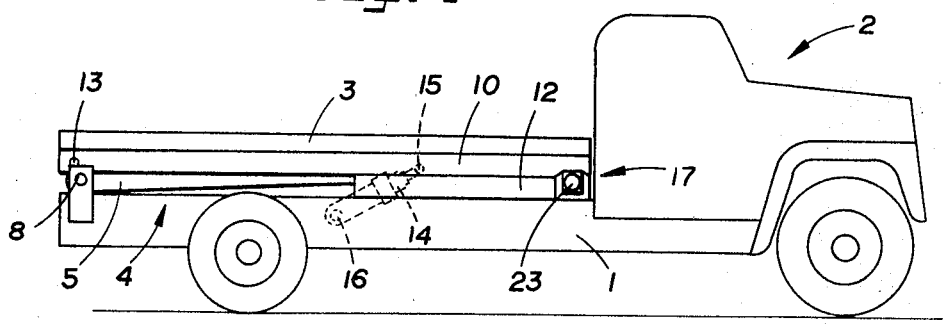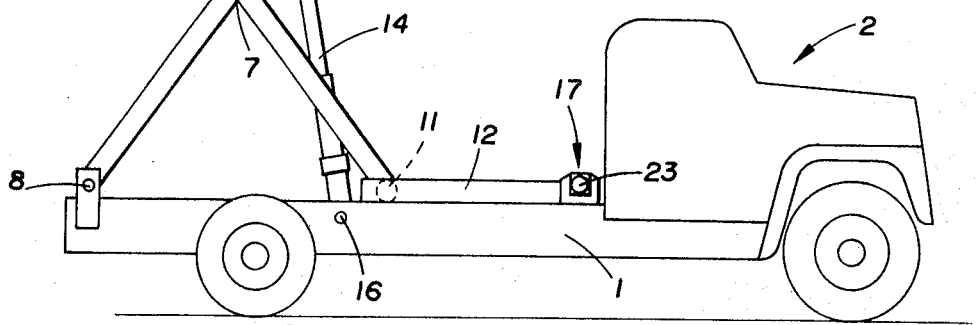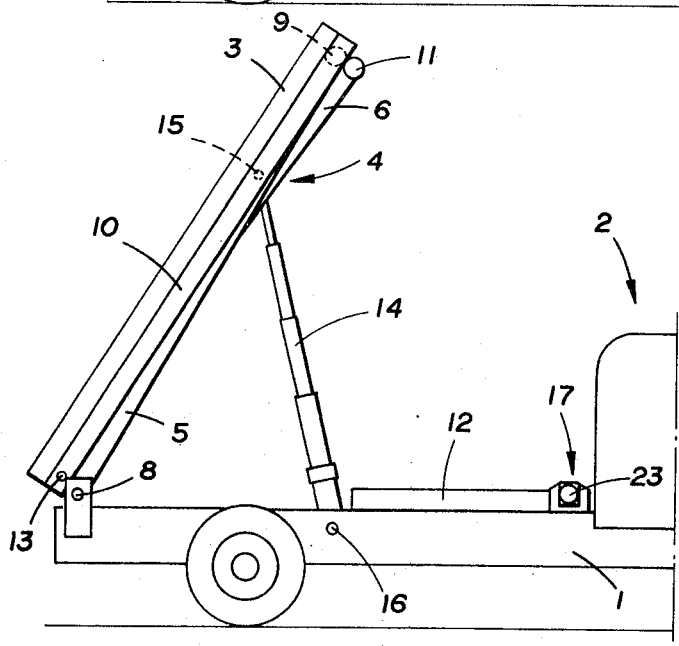

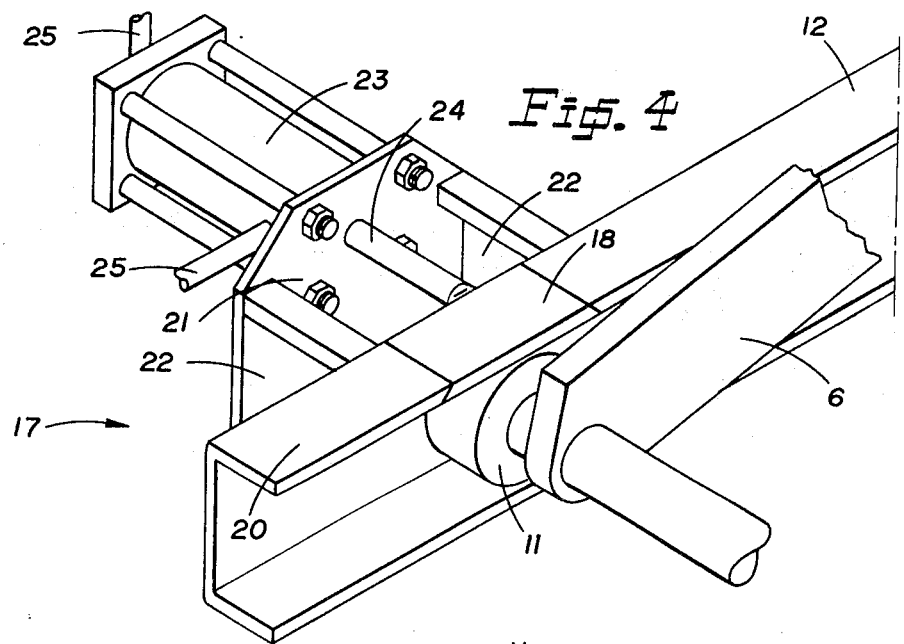
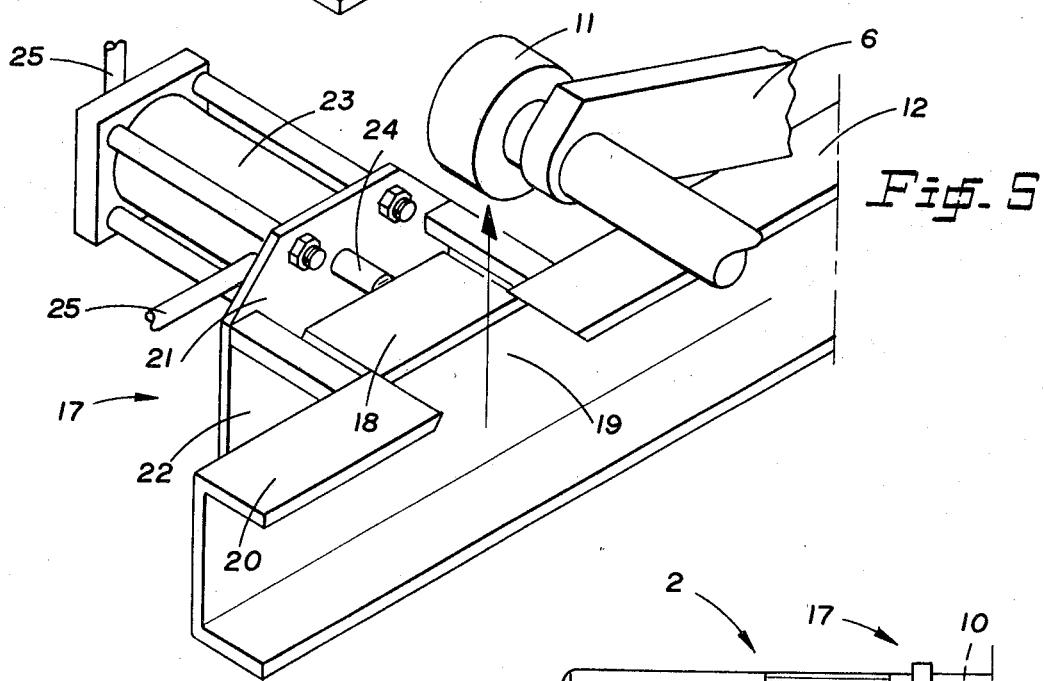
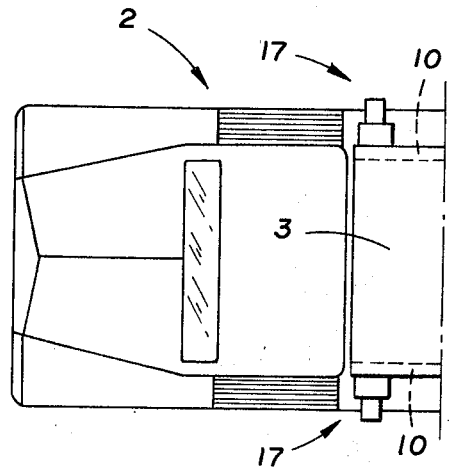

3,642,324

LOAD-SUPPORTING BED UNIT FOR A TRUCK

BACKGROUND OF THE INVENTION

In certain previous lift-type bed units for trucks, the supporting and actuating mechanism for the bed provided for vertical lift with the bed remaining horizontal, or for rearward tilting to a back-dumping position, but the arrangement to accomplish such selective results was frequently unduly complex, and in any event either required the actual interchange of parts or the manual resetting of existing parts in a manner which was impractical and time consuming. The present invention was conceived in an effort to accomplish such selective positioning of the bed in a more facile and practical manner.

SUMMARY OF THE INVENTION

The present invention provides, as an important object, a load-supporting bed unit, for a truck, comprised of a normally lowered but upwardly movable frame connected between a fixed structure on the truck and a load-supporting bed thereabove, and a power device adapted to move the frame upwardly; the frame and associated mechanism being arranged so that the bed, when moved upwardly by the power device, normally remains in its horizontal position, or—upon nonmanual quick repositioning of certain novel means—is caused to tilt rearwardly to a back-dumping position, selectively.

The present invention provides, as another important object, a load-supporting bed unit—as in the preceding paragraph—wherein the frame, which is double-sided, is of vertically extensible but normally downfolded "X" or "scissors" type. Each side of the frame comprises intersecting arms centrally pivotally connected together; the arms at their related rear ends being pivoted on the fixed structure and bed, respectively, and the arms at their related forward ends being fitted with rollers normally positioned for tracking in longitudinal channels on the fixed structure and the bed, respectively. The rollers normally track rearwardly in both such channels, the frame vertically extending or unfolding, and the bed elevating while remaining horizontal, when such frame is moved upwardly by the power device; and said novel means—upon nonmanual quick repositioning thereof—permitting upward escape of the roller corresponding to and from the channel on the fixed structure whereby the frame remains downfolded and the bed tilts rearwardly to back-dumping position when such frame is moved upwardly by said power device.

The present invention provides, as still another important object, a load-supporting bed unit—as in the preceding paragraph—wherein said nonmanual quick-repositioned means comprises a normally closed, power-actuated gate included in the channel on the fixed structure; said channel including a top flange, and the gate being formed therein; the escape of the roller from such channel being upwardly through said flange when the gate is open.

The present invention provides, as a further object, a load-supporting bed unit for a truck which is designed for ease and economy of manufacture.

The present invention provides, as a still further object, a practical, reliable, and durable load-supporting bed unit for a truck, and one which is exceedingly effective for the purpose for which it is designed.

BRIEF DESCRIPTION OF THE DRAWINGS

FIG. 1 is a diagrammatic side elevation of a truck fitted with the load-supporting bed unit of the present invention; the bed being in its lowered, horizontal position.

FIG. 2 is a view similar to FIG. 1 but shows the bed raised and remaining horizontal.

FIG. 3 is a view similar to FIG. 1 but shows the bed as tilted rearwardly to back-dumping position.

FIG. 4 is a fragmentary, enlarged, isometric view of the power-actuated gate unit at the right-hand side of the truck; the view being taken from a point laterally inwardly, and somewhat ahead, of such gate unit; the latter being shown with the gate in closed position to prevent escape from the adjacent channel of the corresponding roller.

FIG. 5 is a view similar to FIG. 4 but shows the gate open to permit escape from the adjacent channel of said corresponding roller.

FIG. 6 is a fragmentary diagrammatic plan view of the truck as in FIG. 1; the view showing the relative positions of the right-hand and left-hand power-actuated gate units.

DESCRIPTION OF THE PREFERRED EMBODIMENT

Referring now more particularly to the drawings and to the characters of reference marked thereon, the load-supporting bed unit of the present invention is mounted in connection with a fixed horizontal frame 1 on a truck indicated generally at 2; such frame 1 being—optionally—the usual truck frame or an accessory one fitted thereover.

A bed 3 overlies the fixed frame 1, and a double-sided, vertically extensible but normally downfolded, "X" or "scissors" type frame—indicated generally at 4—is mounted between such bed 3 and fixed frame 1. As the vertically extensible frame 4 (which is unitary) is alike on each side, a description of one side will be understood to relate to both sides.

The vertically extensible frame 4 comprises, on each side, centrally intersecting arms 5 and 6 pivoted together at the point of intersection, as at 7.

At the rear lower end thereof, the arm 5 is pivoted in connection with the fixed frame 1, as at 8, while at its front upper end such arm 5 is fitted with a roller 9 which tracks in a laterally inwardly opening, longitudinal channel 10 on the underside of bed 3.

At the front lower end thereof, the arm 6 is fitted with a roller 11 which normally tracks in a laterally inwardly opening, longitudinal channel 12 secured on the forward portion of fixed frame 1, while at its rear upper end such arm 6 is pivoted, as at 13, in connection with the rear end of channel 10.

A normally contracted, multistage, hydraulic power cylinder 14 is pivotally connected between the fixed frame 1 and the arm 5 ahead of the pivot 7; the upper and lower pivots for such power cylinder being indicated at 15 and 16, respectively.

The bed unit, as described above, is—in general—of conventional form; the frame 4 being unfolded and vertically extended, and the bed 3 raised to an elevated horizontal position upon energization and expansion of the power cylinder 14. See FIG. 2. The power cylinder 14 is included in a hydraulic conduit system (not shown) which is valve controlled from the cab of the truck.

The improvement provided by the present invention comprises the following:

At the forward end of each channel 12, and in the vertical transverse plane of the corresponding roller 11 when the latter is in its foremost position (i.e., when the frame 4 is lowered and downfolded as in FIG. 1), there is a power-actuated gate unit, indicated generally at 17, mounted in connection with such channel 12. The gate units 17 on opposite sides of the bed unit are in alignment transversely of the truck. See FIG. 6.

Each power-actuated gate unit 17 includes a laterally outwardly slidable, flat gate 18 which normally closes an opening 19 in the top flange 20 of channel 12 at a point directly above the corresponding roller 11 when in its foremost position, and which it occupies when the frame 4 is lowered and downfolded. The opening 19 is of a size to permit (when the gate 18 is open) said corresponding roller 11 to pass upwardly therethrough and thus escape the channel 12.

As shown, the gate 18, at its opposite side edges, has chamfered engagement with the corresponding edges of the top flange 20 on opposite sides of opening 19; the angle of the chamfer being such as to prevent upward movement of said gate 18 relative to such top flange 20.

A mounting plate 21 is disposed in spaced relation laterally outwardly from the channel 12 in the transverse zone of gate 18, and such plate 21 is fixedly secured in connection with the outside of channel 12 by means of spaced-apart attachment members 22; the plate 21 and members 22 thus being in rigid unitary relation with said channel 12.

A double-acting, hydraulic power cylinder 23 is mounted on and extends laterally outwardly from the plate 21, and such power cylinder includes a piston rod 24 which passes through said plate 21 and extends inwardly to connection with the outer edge of the gate 18.

Upon operation of the power cylinder 23 to retract the piston rod 24, the gate 18 is caused to slide outwardly from its normally closed position (see FIG. 4) to its open position (see FIG. 5). The particular purpose of the gate 18 will now be described.

When it is desired to tilt the bed 3 rearwardly to a back-dumping position as in FIG. 3, the power cylinder 23 is actuated to retract the piston rod 24 which slides the gate 18 to open position clear of the opening 19; the corresponding roller 11 being directly below such opening. Nextly, the power cylinder 14 is energized and expanded which causes the assembly of bed 3 and frame 4 to swing upwardly and rearwardly about the pivot 8 as an axis and without such frame 4 unfolding; the bed thus being swung to said rearwardly tilted, back-dumping position. The frame 4, during such swinging motion, remains folded for the reason that said corresponding roller 11—at the outset of such motion—moves upwardly through opening 19 in top flange 20 and escapes the channel 12. With said roller 11 clear of channel 12, there is not force acting on frame 4 which would tend to unfold it, and which unfolding will occur only when rollers 9 and 11 are both in and move along channels 10 and 12, respectively.

The power cylinders 23 of the gate units 17 are, of course, actuated simultaneously; such power cylinders being interposed in a hydraulic conduit system, shown in part at 25, which is valve controlled from the cab of the truck.

The power-actuated gate units 17 make possible—particularly by means of the nonmanual, quick opening of the gates 18—the ready and convenient accomplishment of rearward tilting to back-dumping position of the bed 3, and which otherwise normally remains horizontal in both lowered and raised positions.

From the foregoing description, it will be readily seen that there has been produced such a load-supporting bed unit for a truck as substantially fulfills the objects of the invention, as set forth herein.

While this specification sets forth in detail the present and preferred construction of the load-supporting bed unit for a truck, still in practice such deviations from such detail may be resorted to as do not form a departure from the spirit of the invention as defined by the appended claims.

I claim:

1. In a load-supporting bed unit for a truck which includes a fixed frame, a bed above the fixed frame, a normally downfolded but vertically extensible frame connected between the fixed frame and the bed, such extensible frame having intersecting pivotally connected arms, means pivoting the related rear outer ends of such arms on the fixed frame and bed, respectively, rollers on the front outer ends of the arms, channels on the fixed frame and bed in which the related rollers are normally retained in tracking relation, a power device between the fixed frame and extensible frame normally operative to unfold and extend the latter and to thus move the bed upwardly relative to the fixed frame, a normally closed gate in the channel on the fixed frame, means to open and close the gate, said gate being disposed so that when open it permits of upward escape therethrough of the related roller from the position occupied thereby when the extensible frame is downfolded, and said related roller so escaping, the extensible frame remaining downfolded, and the bed tilting rearwardly to back-dumping position when the power device is operated with the gate open; the channel on the fixed frame including a top flange, and a portion of such top flange comprising the gate, said gate being laterally slidable between a closed position and an open position, and said means to open and close the gate including a fluid pressure actuated power cylinder mounted on and projecting laterally, in alignment with the gate, from said channel on the fixed frame, and the power cylinder having a reciprocable piston rod extending toward and connected to the gate.

2. In a load-supporting bed unit for a truck which includes a fixed frame, a bed above the fixed frame, a normally downfolded but vertically extensible frame connected between the fixed frame and the bed, such extensible frame having intersecting pivotally connected arms, means pivoting the related rear outer ends of such arms on the fixed frame and bed, respectively, rollers on the front outer ends of the arms, channels on the fixed frame and bed in which the related rollers are normally retained in tracking relation, a power device between the fixed frame and extensible frame normally operative to unfold and extend the latter and to thus move the bed upwardly relative to the fixed frame, a normally closed gage in the channel on the fixed frame, means to open and close the gate, said gate being disposed so that when open it permits of upward escape therethrough of the related roller from the position occupied thereby when the extensible frame is downfolded, and said related roller so escaping, the extensible frame remaining downfolded, and the bed tilting rearwardly to back-dumping position when the power device is operated with the gate open; the channel on the fixed frame including a top flange, and a portion of such top flange comprising the gate, said gate being slidably mounted while restrained against the upward movement relative to said top flange, and said means to open and close the gate including a fluid pressure actuated power cylinder mounted on said channel on the fixed frame, and the power cylinder having a reciprocable piston rod connected with and operative to reversibly slide the gate to open and close the same; the gate, at its opposite side edges, having chamfered engagement with the corresponding edges of the top flange, and the angle of the chamfer being such as to provide said restraint against upward movement of the gate.

3. In a load-supporting bed unit for a truck which includes a fixed frame, a bed above the fixed frame, a normally downfolded but vertically extensible frame connected between the fixed frame and the bed, such extensible frame having intersecting pivotally connected arms, means pivoting the related rear outer ends of such arms on the fixed frame and bed, respectively, rollers on the front outer ends of the arms, channels on the fixed frame and bed in which the related rollers are normally retained in tracking relation, a power device between the fixed frame and extensible frame normally operative to unfold and extend the latter and to thus move the bed upwardly relative to the fixed frame, a normally closed gate in the channel on the fixed frame, means to open and close the gate, said gate being disposed so that when open it permits of upward escape therethrough of the related roller from the position occupied thereby when the extensible frame is downfolded, and said related roller so escaping, the extensible frame remaining downfolded, and the bed tilting rearwardly to back-dumping position when the power device is operated with the gate open; the channel on the fixed frame including a top flange, the related roller occupying a predetermined position below such top flange when the extensible frame is downfolded, and the portion of the top flange directly above the roller, when in said position, comprising the gate; said gate being mounted for straight-line lateral sliding while restrained against upward movement relative to said top flange, and said means to open and close the gate including a laterally projecting, fluid pressure actuated power cylinder mounted on the channel on the fixed frame, said power cylinder being connected with and operative to reversibly slide the gate to open and close the same.

* * * * *